INVENTOR.
John W. Dickey
BY
Clinton L. James
ATTORNEY

WITNESS:
Esther M. Stockton

United States Patent Office 2,725,758
Patented Dec. 6, 1955

2,725,758

VARIABLE SPEED TRANSMISSION FOR WASHING MACHINES

John W. Dickey, Newfield, N. Y., assignor to Bendix Aviation Corporation, Elmira Heights, N. Y., a corporation of Delaware Application June 28, 1954, Serial No. 439,545

5 Claims. (Cl. 74—359)

The present invention relates to a variable speed transmission for washing machines and the like, and more particularly to a transmission of this type which is adapted for automatic control, incorporating a means for cushioning the shock attendant upon change of gear ratio.

It is an object of the present invention to provide a novel variable speed transmission which is efficient and reliable in operation and simple and economical in construction.

It is another object to provide such a device having a coupling arranged to yield and slip under overload incident to the shift from a low gear ratio to a higher one.

It is another object to provide such a device in which the slip coupling is readily calibrated for the torque to be transmitted, and will retain its calibration over very long periods of service.

Further objects and advantages will be apparent from the following description taken in connection with the accompanying drawing in which.

Figure 1:
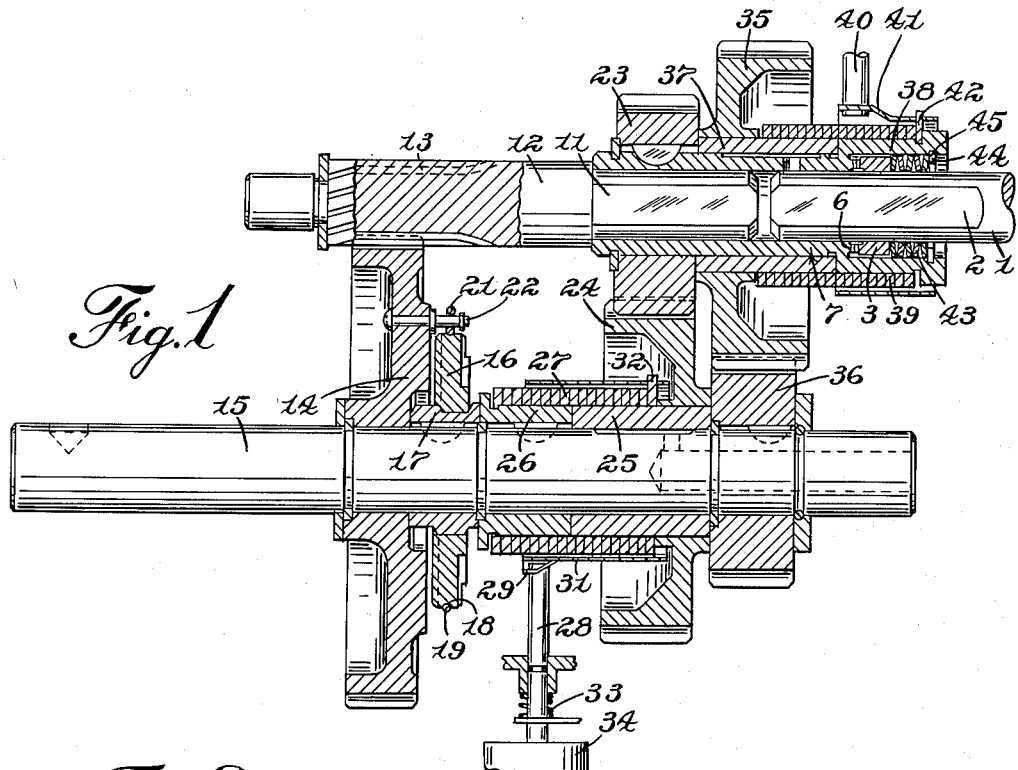
Fig. 1 is a side elevation, partly broken away and in section, of a preferred embodiment of the invention.

In Fig. 1 of the drawing there is illustrated a power shaft 1 which is provided for a portion of its length with a "double-D" section 2 on which a driving coupling member 3 is slidably but non-rotatably mounted.

Figure 2:
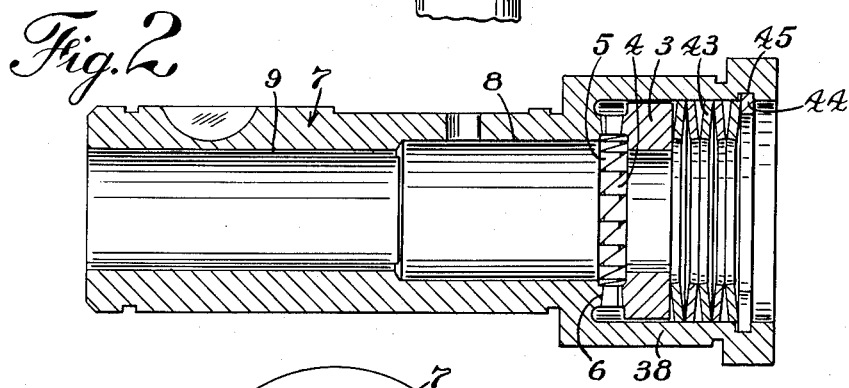
Fig. 2 is an enlarged sectional detail of the slip coupling device.
Figure 3:
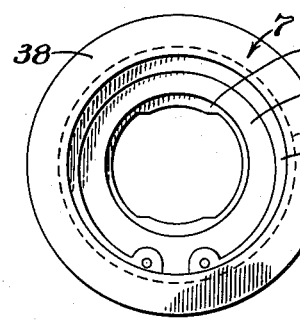
Fig. 3 is an end view looking from the right in Fig. 2.

The coupling member 3, as best shown in Fig. 2, is provided with a series of axially extending teeth 4 having inclined driving surfaces arranged to mesh with similar teeth 5 formed on an internal shoulder 6 of a coupling sleeve indicated generally by numeral 7. The coupling sleeve is provided with a counterbore 8 slidably and rotatably receiving the end of the power shaft 1, and for the remainder of its length is formed with a hollow "double D" section 9 conforming with and slidably receiving the correspondingly formed end 11 of a driving shaft 12. The opposite end of the driving shaft 12 is formed with gear teeth constituting a low speed driving pinion 13 which is adapted to mesh with a low speed driven gear 14 journaled on a driven shaft 15 located parallel to the driving shaft.

An overrunning clutch connection from the driven gear 14 to the driven shaft 15 is provided comprising a clutch nut 16 threaded on a screw shaft 17 fixedly mounted on the drive shaft, the inclination of the thread of the screw shaft being such that the adjacent surfaces of the driven gear and clutch nut are brought into clamping engagement by the screw-jack action of the screw shaft and nut when driving torque is transmitted through the clutch nut. In order to initiate such driving engagement, the clutch nut is provided with a peripheral groove 18 in which a split spring ring 19 is frictionally mounted, said ring having a loop 21 at the leading end. A pin 22 fixedly mounted in the driven gear 14 is arranged to engage the loop 21 of spring 19 and cause the spring to draw the clutch nut 16 into clamping engagement with the gear 14.

An intermediate driving pinion 23 is rigidly mounted on the clutch sleeve 7 and is arranged to mesh with a gear 24 journaled on the driven shaft 15. Gear 24 has a smooth cylindrical hub 25 formed thereon or integrally connected thereto, and a cylindrical sleeve 26 having the same external diameter is rigidly mounted on the driven shaft. Means for connecting the gear 24 to rotate the driven shaft is provided in the form of a coiled spring clutch member 27 which surrounds the cylindrical surfaces of the hub 25 and sleeve 26 and is arranged to wrap down and grip the surfaces when torque is transmitted from the gear to said sleeve. The spring member 27 is held out of clutching engagement when it is not desired to transmit torque therethrough, by means of a pin 28 which is movable into engagement with a lug 29 on a sleeve 31 loosely surrounding the clutch spring 27. The clutch spring has an outturned end 32 engaging in the sleeve 31, whereby when the rotation of sleeve 31 is prevented by the pin 28 the driving end of the clutch spring is arrested and the hub 25 of gear 24 consequently permitted to rotate freely. A spring 33 normally urges the pin 31 into operative position, and a solenoid 34 is provided for withdrawing the pin when it is desired to render the intermediate speed gearing operative.

A high speed gear 35 is journaled on an intermediate portion of the coupling sleeve 7 and is arranged to mesh with a high-speed driven pinion 36 fixed on the driven shaft 15. Gear 35 is provided with a cylindrical hub 37, and coupling sleeve 7 is formed with a cylindrical enlargement 38 having the same external diameter. A spring clutch element 39 is arranged to form a driving connection from the sleeve 7 to the gear 35 when permitted by withdrawal of a pin 40 from engagement with a sleeve 41 connected with the driving end 42 of the clutch spring. Such withdrawal of pin 40 may be effected by a second solenoid similar to solenoid 34 with suitable means to prevent simultaneous energization of both solenoids.

The driving coupling member 3 is loosely housed within the enlarged portion 38 of the coupling sleeve 7, and means are provided for pressing the teeth 4 of the driving coupling member against the teeth 5 in the sleeve with a predetermined force sufficient to cause the inclined surfaces of the teeth to transmit normal driving torque, but to permit the teeth to disengage under shock loads. For this purpose a plurality of spring discs or washers 43 are loosely mounted in the enlarged portion 38 of coupling sleeve 7 and are maintained under a predetermined initial pressure by a split lock ring 44 seated in a groove 45 in the interior of said sleeve.

In operation, rotation of the power shaft 1 is transmitted through the driving coupling member 3 to the coupling sleeve 7 which correspondingly rotates driving shaft 12. If the clutch springs 27 and 39 are held out of engagement by the corresponding control pins 28 and 40, the low-speed gear 14 as rotated by the driving pinion 13 transmits torque through the overrunning clutch 16, 17 to the driven shaft 15 which consequently rotates at low speed. When it is desired to operate at the intermediate speed, energization of the solenoid 34 causes withdrawal of the pin 28, permitting the clutch sleeve 27 to connect the intermediate driven gear 24 to the driven shaft which is consequently rotated by the pinion 23 at the intermediate speed while the overrunning clutch 16, 17 is automatically disengaged by the acceleration of the screw shaft 17.

Although the engagement of the clutch sleeve 27 is frictional in character it takes place quickly and positively due to the wrap-down action of the clutch sleeve. Since the rotating parts of the motor and transmission, and of the element to be operated by the driven shaft 15 have considerable inertia, this sudden change of driving gear ratio places a heavy momentary load on the transmission which substantially exceeds the normal driving torque. This excessive torque causes the teeth 4 of the driving coupling member 3 to slide over the teeth 5 of the coupling sleeve 7, as permitted by compression of the spring rings 43, thereby limiting the torque transmitted through the gearing, and providing a time interval for acceleration of the driven shaft 15 after which the parts rotate in unison.

When it is desired to operate at high speed, release of the pin 28 by deenergization of the solenoid 34, and subsequent withdrawal of the pin 40 in any suitable manner permits the clutch sleeve 39 to drive the high-speed gear 35 which thereupon rotates the pinion 36 and shaft 15 at high speed. The shock attendant upon the engagement of the clutch sleeve 39 is cushioned in the same manner by slippage of the teeth of the driving coupling member 3 over the teeth of the coupling sleeve 7 as above described.

Although but one form of the invention has been shown and described in detail it will be understood that various changes may be made in the precise form and arrangement of the parts without departing from the spirit of the invention.

I claim:

1. In a variable speed transmission, a power shaft, a driving shaft in alinement therewith, a driven shaft parallel to the driving shaft, a plurality of gear trains for connecting the driving and driven shafts at different gear ratios, means for selectively rendering said gear trains operative, a coupling sleeve telescoped over the power shaft and driving shaft and having a non-rotatable connection with one of said two alined shafts, a coupling collar slidably but non-rotatably mounted on the other of said two shafts, said sleeve and collar having interengaging teeth with torque-transmitting surfaces inclined to the axis of the shafts, and yielding means resisting disengagement of said teeth.

2. A variable speed transmission as set forth in claim 1 in which the means for selectively rendering the gear trains operative comprises a self-tightening clutch connection for each gear train and separately operable means for initiating the closure of each clutch.

3. A variable speed transmission as set forth in claim 2 in which the coupling sleeve is non-rotatably mounted on the driving shaft, and the coupling collar is splined on the power shaft and slidably journaled in said sleeve.

4. A variable speed transmission as set forth in claim 3 in which the power shaft is slidably journaled in the coupling sleeve, and said sleeve is provided with a counterbore for receiving the coupling collar, said sleeve having an internal annular shoulder on which the inclined teeth are formed.

5. A variable speed transmission as set forth in claim 4 in which the means for resisting disengagement of the coupling teeth comprises a compression spring in the counterbore of the coupling sleeve at the rear of the splined collar, and a thrust ring seated in the interior of said sleeve maintaining said spring under predetermined pressure.

References Cited in the file of this patent

UNITED STATES PATENTS

| | | |
|---|---|---|
| 2,167,846 | Martin | Aug. 1, 1939 |
| 2,191,609 | Dodge | Feb. 27, 1940 |
| 2,606,452 | Dyer | Aug. 12, 1952 |
| 2,609,702 | Rogers | Sept. 9, 1952 |